Nov. 20, 1956 E. LAWSON, SR 2,771,271
DUST COLLECTOR FOR DRILLS
Filed Sept. 24, 1954 4 Sheets-Sheet 3
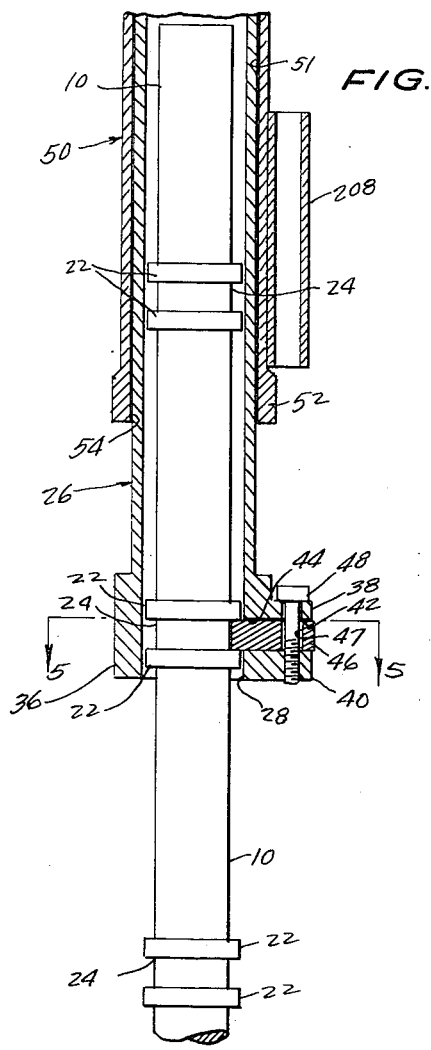
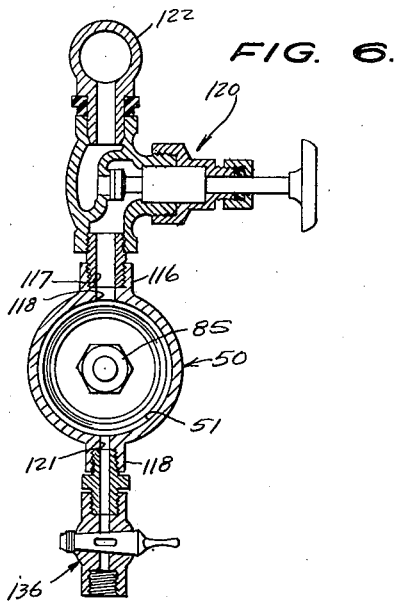
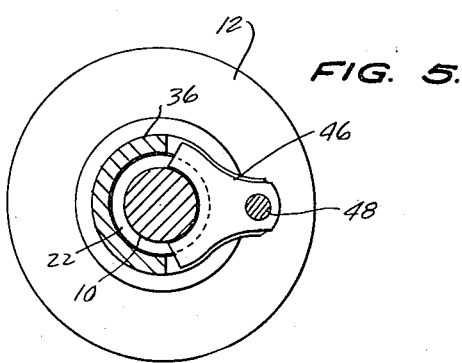
INVENTOR.
EDGAR LAWSON, SR.
BY
McMorrow, Berman + Davidson
ATTORNEYS.

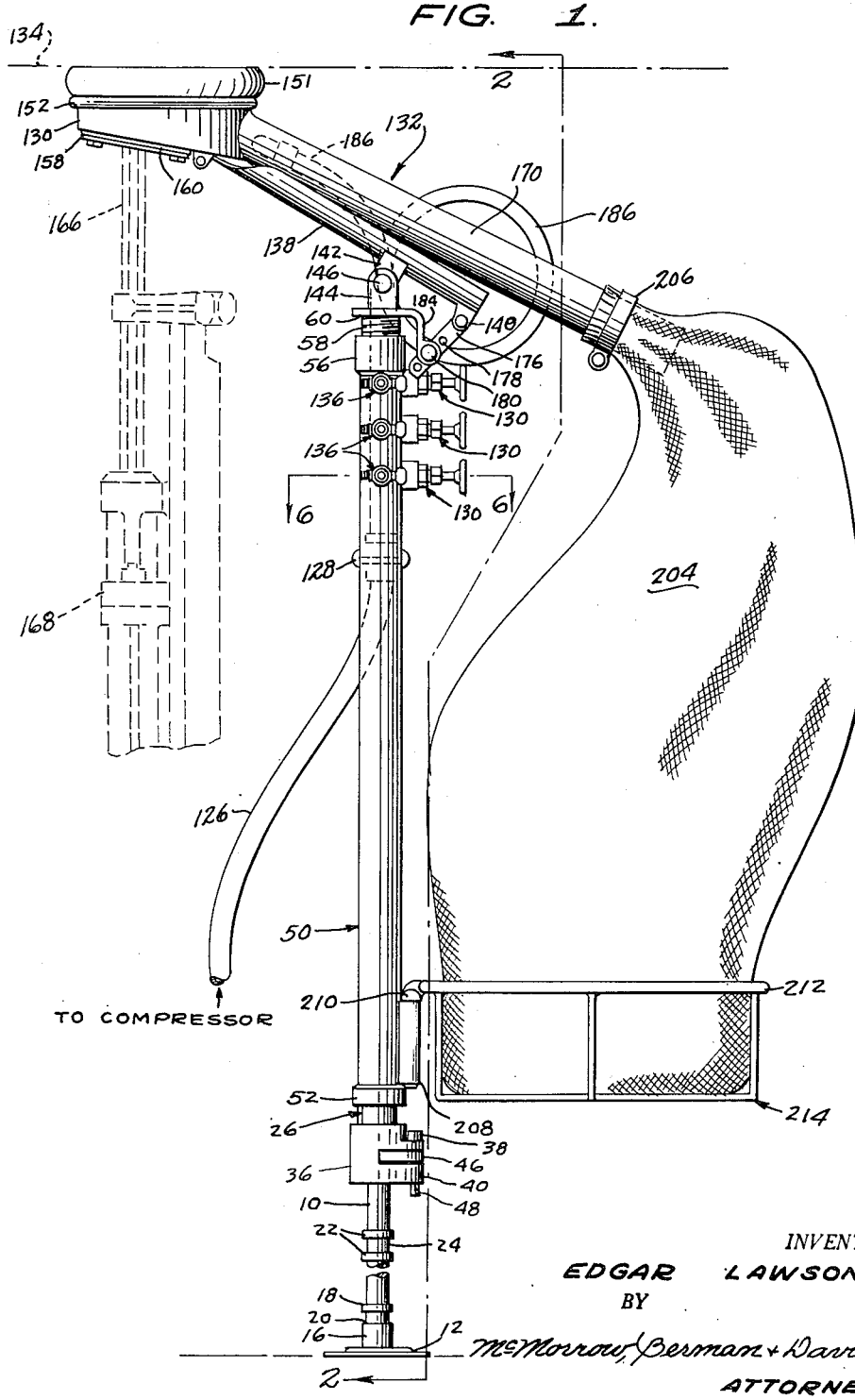

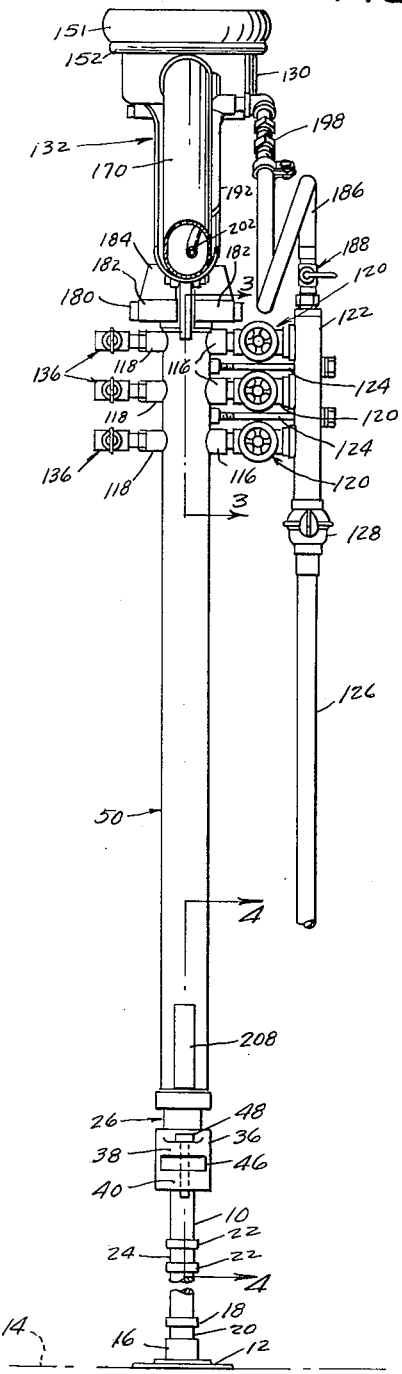
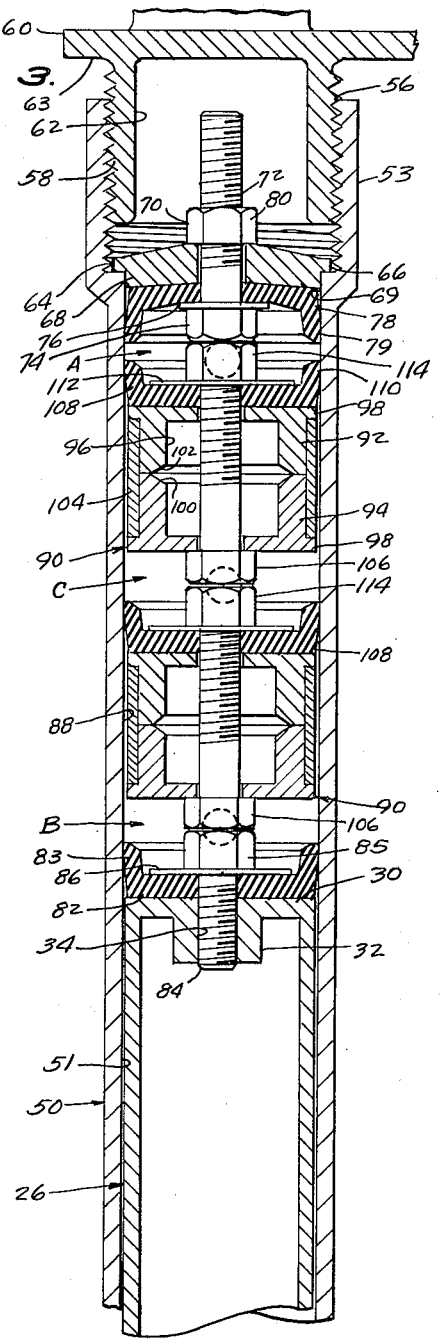

Nov. 20, 1956   E. LAWSON, SR   2,771,271
DUST COLLECTOR FOR DRILLS
Filed Sept. 24, 1954   4 Sheets-Sheet 4

INVENTOR.
EDGAR LAWSON, SR.
BY
McMorrow, Berman + Davidson
ATTORNEYS.

United States Patent Office 2,771,271
Patented Nov. 20, 1956

2,771,271

DUST COLLECTOR FOR DRILLS

Edgar Lawson, Sr., Wilcoe, W. Va.

Application September 24, 1954, Serial No. 458,101

13 Claims. (Cl. 255—50)

This invention relates to dust-collecting means, and more particularly to dust-collecting means especially designed for use with a drill for removing the dust from adjacent the mouth of the drill hole and caused by the operation of the drill bit into a drilling surface.

It is an object of this invention to provide a dust collector for drilling operations, especially where the drilling operation is to be conducted overhead, in which the dust collector will be firmly seated against the surface to be drilled so as to collect all the dust and thereby eliminate dust clouds which cause physical discomfort and hamper the visual observation of the operator.

It is a further and important object of this invention to provide a dust collector in which continuous operation of the collector is insured despite a leakage which may develop in the sealing means for the fluid pressure operating the dust collector. This is important since in dust collectors of this type, it often happens that the sealing means for the fluid pressure which operates the longitudinal extent of the collector is worn to a point where the fluid pressure leaks about the seal thereby rendering the dust collector inoperative.

Another and still further object of this invention is to provide a dust collector for overhead drilling operations in which the dust collecting head may be initially preset to conform to irregularities and obliqueness of the surface to be drilled, and in which the length of the collector may be selectively preset so that the fluid operating means will cause a minimum of movement of the collector in extending it to the proper length so that the dust collector is firmly fixed between a supporting surface and the surface to be drilled.

As another important consideration in the conception of this invention, it will be appreciated that, especially in coal mining, the coal dust constitutes a safety hazard since this coal dust is readily ignitable, and therefore the present invention will provide for continuous operation of the dust collector to obviate the danger rising from coal dust escaping into the mine tunnel in which the operator must work.

Yet another object of this invention is to provide a dust collector which may be quickly and easily set up and is readily transportable from one place of use to another, so that little time is lost between drilling operations at one location and subsequent drilling operations at different locations. Also, the dust collector embodying this invention will be readily capable of conforming to the uneven surfaces between which it extends and will be firmly fixed between these surfaces for continuous operation.

Other objects and advantages will become apparent from a consideration of the following detailed description, forming the specification, and taken in conjunction with the accompanying drawings, in which:

Figure 1 is a side elevational view of the dust collector embodying this invention as it would appear in operative position and showing the application of a power operated drill, in broken lines, thereto;

Figure 2 is a rear elevational view taken substantially along line 2—2 of Figure 1;

Figure 3 is a cross sectional view taken along line 3—3 of Figure 2, and shown on a somewhat enlarged scale;

Figure 4 is an enlarged sectional view taken substantially on line 4—4 of Figure 2;

Figure 5 is a transverse cross sectional view taken along line 5—5 of Figure 4;

Figure 6 is an enlarged, transverse cross sectional view taken along line 6—6 of Figure 1, showing the valve means whereby fluid pressure may be selectively introduced into the dust collector;

Figure 7:
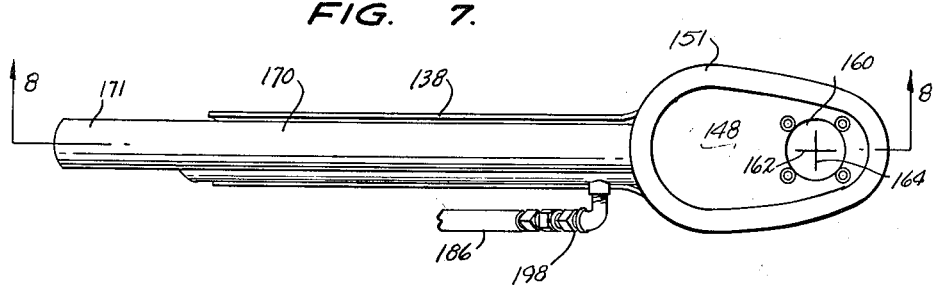
Figure 7 is a top plan view of the dust collecting head.
Figure 8:
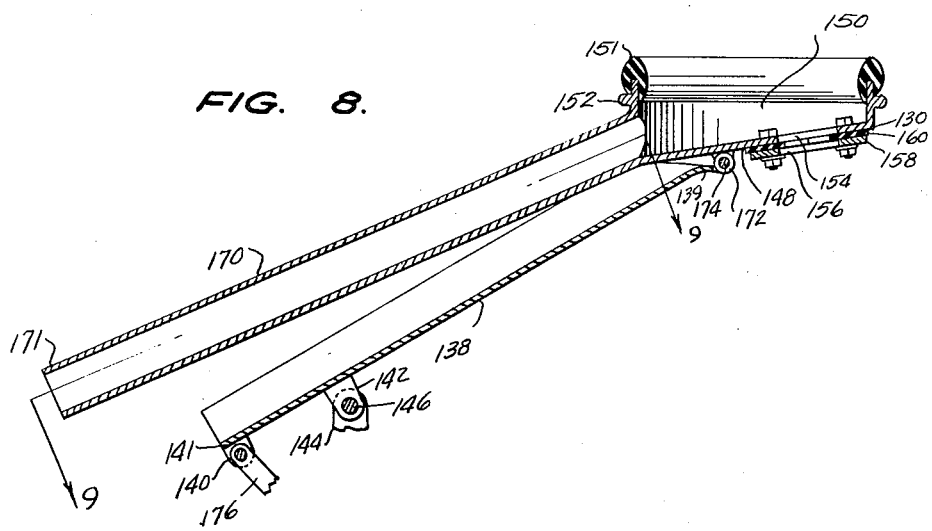
Figure 8 is a longitudinal, cross sectional view of the dust collecting head taken substantially along line 8—8 of Figure 7.
Figure 9:
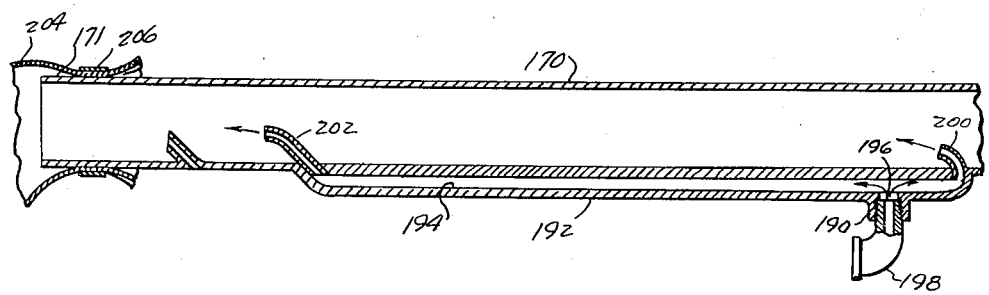
Figure 9 is a longitudinal cross sectional view taken substantially along the line 9—9 of Figure 8.

With continued reference to the drawings, the dust collecting apparatus constructed in accordance with the present invention includes a post 10 having a broad base 12 for contact with a supporting surface 14. The base 12 has an upstanding socket 16 into which the lower end of the post is securably received so that the post is in upstanding relation to the supporting surface. It will be apparent, that the socket 16 and base 12 may be formed as an integral part of the post 10, if so desired.

Spaced slightly above the top of the socket 16 is an annular, projecting collar 18 so as to define a locking lug receiving space 20 therebetween. At spaced intervals along the longitudinal extent of the post 10, there is provided similar collars 22 in slightly spaced relation to each other and extending in annular projecting relation from the post 10 to define therebetween locking lug receiving spaces 24.

A piston, generally indicated at 26, is in the form of a hollow cylinder having an open end 28 into which projects the upper end of the post 10 so that the piston is carried by the post in upstanding relation thereto and longitudinally thereof. The other end of the piston 26 is closed to define a piston head 30 and is provided with a downwardly dependent, circular, integral boss 32 centrally thereof and provided with a tapped opening 34 centrally therethrough opening to the upper surface of the piston head 30 and into the interior of the piston 26.

The lower end of the piston 26 has integrally formed therewith an annular flange 36 having outwardly projecting ears 38 and 40 in spaced relation to define a slot 42 therebetween the slot 42 being in communication with a slot of similar dimension through the flange 36, as indicated at 44, so that the slots 42 and 44 define a passage for receiving a locking lug 46.

The locking lug 46 is adapted to enter a selected one of the spaces 24 so as to maintain the piston 26 at a selected location longitudinally of the post 10 so as to selectively space the lower open end 28 from the base 12. Also, the locking lug 46 may be disposed so as to enter the space 20 at the lower extremity of the longitudinal adjustment of the piston relative to the post.

In order to prevent accidental displacement of the locking lug 42, the inner end of which is arcuately formed so as to correspond to the curvature of the post 10 forming the bottom wall of the annular spaces 20 and 24, there is provided suitably aligned openings in the ears 38 and 40 which will be in register with an opening 47 transversely through the locking lug to receive through the aligned and registering openings a bolt 48. The opening or bore through the ear 40 is preferably internally threaded to have the threaded shank of the bolt 48 engage therewith.

A cylinder, generally indicated at 50, has an annular flange 52 formed at its lower open end 54 and has its upper open end 56 of somewhat greater diameter than the bore of the cylinder and provided with internal threading so that this open end may be closed by the externally threaded, depending collar 58 of a closure cap 60. It will be noted that the collar 58 is hollow to define an annular space 62 bounded by the inner surface of the wall of the collar 58 and the upper annular flange 64 of the cap 60.

The open end 54 telescopically receives the piston 26 with the piston head 30 extending therein so that the cylinder 50 is slidably mounted on the piston 26 for movement longitudinally thereof.

An annular shoulder 64 is formed in the cylinder 50 adjacent the juncture of the enlarged diameter flange 53 at the upper open end 56 with the body of the cylinder. An annular, lateral projection 66 of a seal cap 68 is adapted to rest upon the shoulder 64 with the portion of the seal cap extending therebelow snugly received within the bore 51 of the cylinder 50. A seal cap 66 is provided with a bore 70 extending centrally transversely therethrough for the reception therein of the shank of a bolt 72, the head of the bolt, indicated at 74, being disposed below the lower surface 69 of the seal cap 66. A washer 76 is carried by the bolt 72 and rests against the lower surface of the head 74 thereof so that a cup-shaped fluid seal 78 may be carried by the bolt 72 with an inner surface of the base of the seal in contact with the washer 76 while the outer face of the fluid seal base is contacted by the lower surface 69 of the seal cap whereby the seal may be retained on the bolt between the washer and the seal cap and maintained in proper position by a nut 80 received on the threaded shank portion 72 of the bolt to contact the upper surface of the seal cap 66, as clearly shown in Figure 3.

It will be noted that the annular rim 79 of the seal 78 extends downwardly from the enlarged flange 53 and is disposed in sealing contact with the inner wall of the cylinder bore 51.

A fluid seal 82, similar to the seal 78, is carried by the outer face of the piston head 30 by a bolt 84 having its threaded shank portion passing through a suitably formed opening transversely through the seal and threadingly engaging in the internally threaded bore 34 with a washer 86 disposed between the bolt head 85 and the inner surface of the base of the seal 82 so that the annular rim 83 extends upwardly from the piston head 30 and is in sealing contact with the bore 51 of the cylinder 50.

Thus, there is defined between the seals 78 and 82 a fluid recieving chamber 88.

The seal cap 68 closes one end of the cylinder bore 51 to define a cylinder head which is in spaced relation to the piston head 30 and disposed thereabove.

One or more floating pistons, generally indicated at 90, may be disposed within the chamber 88, with the drawings showing a pair of such pistons by way of illustration. Each of the pistons 90 comprise a pair of identical opopsitely disposed body parts 92 and 94 disposed in abutting relation. Each of the body parts is formed with a hollow core 96 defined by the inner annular wall of the body member and the parts of an annular base 98 projecting laterally outwardly from the body and formed integrally therewith at one end thereof.

The central cores of the body parts 92 and 94 open to the opposite end of each of the body parts so that when the parts are placed together, as shown in Figure 3, the cores will be in alignment and the bases 98 will be disposed at opposite ends. The end faces of the body parts remote from their bases are internally chamfered as at 100 and 102 respectively to define a central groove annularly about the floating piston at the juncture of the abutting faces of the body parts.

A band 104 encircles the piston 90 and extends between the bases 98 of each of the body parts when the parts are placed in abutting relation. The body parts 92 and 94 of the floating pistons 90 are maintained together in abutting relation by a bolt 106 passing upwardly through suitably aligned openings in the respective bases 98, and also passes through a registering opening provided centrally transversely through a fluid seal or packing member 108, similar to the seals 78 and 82.

Thus, it will be seen that a fluid seal 108 is carried by each of the floating pistons 90 on the outer surface of the base 98 of the upper body part 92 thereof with the annular rim 110 of the seal or packing member disposed outwardly therefrom and toward the rim 79 of the seal 78 and disposed in the same direction as the rim 83 of the seal 82 carried by the piston head 30. A washer 112 is carried by the bolt 106 on its threaded shank portion and overlies the surface of the base of the seal 108 so that the seal may be secured on the floating piston by a nut 114 threaded onto the terminal end of the threaded shank portion of the bolt so as to maintain the seal 108 between the washer 112 and the outer surface of the base 98 of the upper part 92 of a floating piston 90.

It will be noted that the nut 114 will contact the head 74 of a bolt 72 carried by the cylinder head so as to space the seals 78 and 110 from each other and define therebetween a fluid receiving compartment A. Similarly, a head of the bolt 106 will contact the head of the bolt or stud 84 to act as spacer means between the cylinder head 30 and the floating piston 90 and define therebetween a fluid receiving compartment, generally indicated at B.

In the case where more than a single floating piston 90 is employed, and as shown in the accompanying drawings where a pair of pistons 90 are disposed within the chamber 88, the head of the bolt 106 will cooperate with the nut 114 of the floating piston therebelow so as to be in abutting contact therewith providing spacer means between the floating pistons to define an annular expansible fluid receiving compartment, generally indicated at C. As will presently appear, each of the compartments A, B and C are expansible.

The wall of the cylinder 50 is provided at diametrically opposed locations thereon with a plurality of laterally projecting valve receiving bosses 116 and 118, the number of these diametrically oppositely disposed bosses depending upon the number of fluid receiving compartments provided, and in the present case, there are three such compartments illustrated, thus there will be three bosses 116 and 118 carried by the wall of the cylinder 50 adjacent the upper end thereof. Each of the bosses 116 and 118 are provided with a central bore longitudinally therethrough opening to the outer end thereof and in communication with respective ones of the fluid receiving compartment A, B and C at diametrically opposite locations with respect thereto. Preferably, the bores in the bosses 116 and 118 are internally threaded to receive the usual fittings whereby a manually operated valve, generally indicated at 120, may be operatively connected to a valve receiving boss 116 so that there are, in the present case, three valves 120 provided. The valves 120 define the fluid inlet valve and may be of usual construction for this purpose.

Each of the valves 120 is in communication with the bore 117 through the respective bosses 116, the bore 117 being in axial alignment with spaced openings 119 through the cylinder wall with the openings 119 forming the communicating passage between the respective compartments A, B and C and the respective valves 120.

As shown in Figures 2 and 6, the valve 120 is interposed in a fluid passage between a hollow cylinder 122 carried by the operating cylinder 50 in spaced parallel relation thereto by a plurality of bolts or studs 124 extending laterally from and perpendicularly to the side wall of the operating cylinder 50 and projecting perpendicularly thereto and operatively connected adjacent its opposite end to the end secured to the wall of the cylinder 50 to the hollow cylinder 122.

A conduit 126 is connected to the cylinder 122 at its lower open end by a usual leak-proof connection 128, the other end of the conduit being operatively connected to a source of fluid pressure, preferably compressed air. Thus, the cylinder 122 defines a fluid passage carried by the operating cylinder 50 in spaced parallel relation thereto and between which the valves 120 are interposed.

Thus, it will be seen that by selectively opening the uppermost one of the valves 120, fluid in the form of compressed air will be admitted into the fluid receiving compartment A to thereby cause the cylinder to move longitudinally of the piston 26 in a direction away from the base 12 of the post 10 upon which the piston 26 is carried.

If for any reason the seal or packing member 108 carried by floating piston 90 becomes worn to the extent that the fluid pressure is permitted to leak thereby, the next lower valve 120 may be opened to admit fluid pressure into the next fluid receiving compartment C to thereby render the dust collector operative insofar as the movement of the cylinder 50 relative to the piston 26 is concerned.

Similarly, if a leak occurs about the next seal or packing member 108 carried by the next lower floating piston 90, the lowermost one of the valves 120, in communication between the fluid conduit 122 and the port defined by the opening 119, may be open so as to admit the fluid under pressure, compressed air, into the lowermost fluid receiving compartment B whereby the cylinder 50 will be caused to move longitudinally of the piston 26 in a direction away from the lower end of the piston.

The purpose of moving the cylinder 50 longitudinally of the piston 26 is to firmly seat the dust receiving cup 130 of the dust collecting head, generally indicated at 132, against a surface 134 to be drilled.

It is pointed out that in connection with the bosses 118, these bosses are provided with a central bore extending longitudinally therethrough and preferably internally threaded to communicate with an opening 121 in register therewith provided in the side wall of the cylinder 50 at each of the locations of the respective bosses 118. A manually operated, one-way valve is operatively secured to each of the bosses 118, in the manner clearly shown in Figure 6, and each of these valves, generally indicated at 136 will be normally closed during the operation of the dust collector device. However, these valves define bleeding valves to permit escape of the fluid under pressure, compressed air, when it is desired to have the cylinder 50 return to its original position longitudinally of the piston 26. It will be evident that the particular bleeding valve 136 to be opened will depend upon which of the compartments in the chamber 88 is in operation.

It will be also understood, that the inlet valves 120 may be selectively and successively operated from the lowermost to the uppermost ones as well as from the uppermost to the lowermost as hereinbefore described.

The dust collecting head 132 comprises a trough-shaped carrier 138 provided with a pair of spaced, depending ears 140 adjacent one end thereof and a depending ear 142 intermediate its ends but more closely adjacent the spaced ears 140.

The ear 142 is adapted to be disposed between a pair of upstanding lugs 144 carried by the top surface of the cap 60 in spaced parallel relation, with the lugs defining a yoke. The ear 142 is provided with a hole transversely therethrough adapted to be placed in register with aligned apertures transversely through the lugs 144 to receive a pivot pin or bolt 146 therethrough so that the carrier or saddle 138 is mounted on the cap 60 for pivotal movement in an arcuate path about an axis disposed perpendicularly to the longitudinal axis of the cylinder 50.

The dust collecting head 132 has a base 148 with a peripheral wall 150 upstanding therefrom and of lesser height at the forward end than at the back end thereof. Since the base 148 is oval in shape, the peripheral wall 150 will be of a corresponding shape, and in addition, the wall 150 is provided adjacent its upper edge with an outwardly extending lip 152 while a soft rubber sealing ring 151 of annular formation has its peripheral groove receiving the top edge of the wall 150 and engaging the lip 152 along the outer surface of the wall 150.

The base 148 is provided with an opening 154 therethrough adjacent its forward end and centrally between the peripheral margin thereof so as to be in alignment with an opening 156 provided in a securing plate 158 carried by the base 148 therebelow by a plurality of bolts and associated nuts with a sealing member 160 disposed between the plate 158 and the lower surface of the base 148.

The sealing member 160 is preferably made of a resilient sheet material and is provided with perpendicularly disposed lines of cuts 162 and 164 transversely therethrough so that these lines of cut cross at approximately the midpoint location of the member 160 to permit insertion therethrough and through the registering openings 154 and 156 of a drill bit 166 of a power-operated drill 168 so that the drill bit will extend through the cup 130 and be disposed against the surface 134 to be drilled.

Extending outwardly from the rear of the cup 130 is a straight, hollow, tubular conduit 170 which communicates with the interior of the cup through an opening in the wall 150 and is open at its opposite end 171.

A base 148 of the cup 130 is provided with a centrally disposed, depending hinge barrel 172 that fits between spaced, similar hinge barrels carried at the end of the carrier or saddle 138 remote from the end carrying the ears 140 so that a hinge pin 174 may pass longitudinally therethrough to pivotally secure the cup 132 to the carrier or saddle 138 at its forward end 139 remote from the back end 141 so that the cup 130 may move in an arcuate path about an axis spaced from and parallel to the axis about which the carrier or saddle 138 may be moved in its arcuate path.

Thus, it will be seen that there is provided a pair of spaced parallel axes about which the dust collecting head 132 may have the parts thereof move so that the sealing ring 151 may be firmly seated against the surface 134 to be drilled regardless of the angular or uneven disposition of the surface 134.

As an aid to the initial setting of the dust collecting head 132 with regard to the surface 134 to be drilled, a link 176 is pivotally secured at one end between the ears 140, and the link 176 is provided with a plurality of spaced openings 178 therethrough to be selectively engaged by a securing pin 180 passing therethrough and through spaced hinge barrels 182 carried at the lower end of a depending bracket 184 carried by the cap 60 as an extension of the top flange 63 thereof and extending downwardly and upwardly therefrom.

A flexible hose connection 186 is connected between the upper end of the hollow cylinder 122 at the end thereof remote from the end carrying the connection 128, and a conduit 170 at a location adjacent the juncture of the conduit with the cup wall 150. A manually operated, one-way valve, generally indicated 188, is interposed between the end of the hose 186 and the upper end of the tubular cylinder or conduit 122 so that the source of fluid pressure, preferably compressed air, may be selectively introduced into the hose 186 and thence into the conduit 170 adjacent the forward end thereof.

The end of the hose 186 remote from its connection to the valve 188 is operatively connected to the conduit 170 by suitable fittings operatively connected to a centrally bored boss 190 carried by the wall 192 of arcuate formation so as to define a passage 194 between the outer surface of the wall of the conduit 170 in the inner surface of the wall 192. The wall 192 is provided with an opening 196 transversely therethrough and in register with the bore through the boss 190 carried by the wall 192. The wall 192 is closed at opposite ends by merging into the side wall of the conduit 170, and may be formed integrally therewith.

Thus, compressed air or fluid under pressure is introduced through suitable fittings 198 through the hose 186, there will be a flow of compressed air through an arcuately formed nozzle 200 adjacent the forward end of the passage 198, or that end adjacent the boss 190, so as to direct the flow of compressed air or fluid under pressure in a direction transversely of the conduit 170 and therewithin toward the back end 171 thereof. In addition, a second arcuately formed nozzle 202 is carried by the wall of the conduit 170 and extends therewithin, the nozzle 202 being in communication with the passage 194 at the end thereof remote from the end at which the nozzle 200 is in communication therewith, so as to direct the flow of fluid under pressure or compressed air therethrough and into the interior of the conduit 170 in a direction toward the back end 171 of the conduit. A dust collecting bag 204 is secured about the back end of the conduit 170 by a ring clamp 206 and will normally depend therefrom.

Thus, as the drilling operation proceeds and the dust resulting from such operation falls into the dust collecting cup 130, it will be drawn out of the cup 130 through the conduit 170 by action of the compressed air flowing therethrough.

A hollow tubular socket 208 is carried by the operating cylinder 50 adjacent its lower flange 36 and extending longitudinally thereof, both ends of the socket being open. A depending leg 210 carried by the upper ring 212 of a wire dust collecting bag holder, generally indicated at 214 is received in the upper open end of the socket 208 so as to support the holder in which the lower end of the bag 204 may be supported in spaced relation to the operating cylinder 50 and to one side thereof.

From the foregoing, it will be apparent that there has been provided a dust collector for drills comprising a post 10 extending upwardly from a supporting surface, a piston 26 carried by the post and extending longitudinally upwardly therefrom, a cylinder 50 having a closed end defining the cylinder head mounted on the piston and telescopically enclosing the piston with the head of the piston spaced from the cylinder head defined by the seal cap 68, the cylinder 50 being slidably mounted on the piston 26 for movement longitudinally thereof, a first fluid seal 78 carried by the cylinder head and a second fluid seal 82 carried by the piston head to define a fluid receiving chamber 88 therebetween, spacing means in the form of adjoining and abutting bolt heads and nuts carried by a floating piston 90 having a fluid seal carried on one end thereof and disposed in the chamber 88, the spacing means maintaining the seal on the floating cylinder in spaced relation with the fluid seal on the cylinder head to define an expansible fluid receiving compartment A. There is also provided a dust collecting means in the form of the dust collecting head 132 mounted on the closed cylinder end for movement in an arcuate path for engagement with a surface 134 to be drilled and means for supplying fluid, compressed air, under pressure to the compartment A for causing expansion of the compartment by impinging upon the cylinder head to move the cylinder longitudinally of the piston 26 so as to firmly seat the dust collecting means against the surface 134 to be drilled, and the fluid supplying means also being operatively connected to the dust collecting means for removing dust therefrom caused by a drilling operation.

More specifically, there may be provided a plurality of superimposed floating pistons 90 disposed in the chamber 88 with a fluid seal 108 carried by each of the floating pistons on one end thereof, spacer means carried by each of the floating pistons whereby the seal on the uppermost one of the floating pistons is maintained in spaced relation to the fluid seal 78 to define a first expansible fluid receiving compartment A whereby the seals on subsequent floating pistons are maintained in spaced relation with the other end of the floating piston thereabove remote from the end carrying the seal to define additional expansible receiving compartments, such as compartment C, and also to space the other end of the lowermost of the floating pistons 90 remote from the end thereof carrying the seal 108 from the seal 82 carried by the piston head 30 to define still another fluid receiving compartment B therebetween, and means for supplying fluid, preferably compressed air, under pressure to each of the compartments, valve means 120 interposed between the fluid supplying means and each of the compartments whereby the fluid can be introduced by operation of a selected one of the valve means into a selected one of the compartments for causing expansion of the compartment by impinging on the cylinder head to move the cylinder longitudinally of the piston 30 so as to firmly seat the dust collecting means in the surface 134 to be drilled.

In addition, the dust collecting means comprises a dust collecting head, generally indicated at 132, which includes a saddle or carrier 138 mounted on the closed end of the cylinder for movement in an arcuate path about an axis perpendicular to the axis of the cylinder 50, a dust collecting cup mounted on the saddle for movement in an arcuate path about an axis parallel to and spaced from the axis about which the saddle moves in its arcuate path, the movements of the saddle and the cup 130 permitting sealing contact of the soft rubber ring 151 carried by said cup with the surface 134 to be drilled regardless of the angular disposition or unevenness of the surface, and an exhaust conduit 170 carried by the cup 130 and operatively connected to the means supplying fluid under pressure for carrying away the dust occasioned by a drilling operation.

Also, there is provided means whereby the initial height of the dust collecting device of this invention may be initially set, this means comprising a plurality of locking lug receiving means defined by the spaced collars 22 and the locking lug receiving space therebetween as well as the collar 18 and the upper surface of the socket 16 with the locking lug receiving space defined therebetween, and cooperating means defined by the flange 36 on the lower end of the piston 26 having the slot 44 therethrough which is adapted to be placed in register with a selected one of the locking lug receiving means on the post 10 for disposing the piston 26 at a given height above the supporting surface 14, and a locking lug 46 receivable in the cooperating means for maintaining the piston 26 at the given height.

While there are shown and described the preferred embodiment of the invention, it is to be understood that the structure is susceptible to change and modification within the practicability of the invention and therefore should be limited only by the scope of the claims appended hereto.

What is claimed is:

1. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating piston in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first-mentioned piston to firmly seat said dust collecting means against said surface to be drilled and for supplying fluid pressure to said dust collecting means to remove dust therefrom caused by a drilling operation.

2. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first-mentioned piston to firmly seat said dust collecting means against said surface to be drilled and for supplying fluid pressure to said dust collecting means to remove dust therefrom caused by a drilling operation, said dust collecting means comprising a dust collecting head including a saddle mounted on the closed end of said cylinder for movement in an arcuate path about an axis perpendicular to the axis of said cylinder, a dust collecting cup mounted on said saddle for movement in an arcuate path about an axis parallel to and spaced from the axis about which said saddle moves in its arcuate path, the movement of said saddle and said cup permitting sealing contact of said cup with the surface to be drilled regardless of the angular disposition of said surface, and an exhaust conduit carried by said cup and operatively connected to said means supplying fluid under pressure.

3. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first-mentioned piston to firmly seat said dust collecting means against said surface to be drilled and for supplying fluid pressure to said dust collecting means to remove dust therefrom caused by a drilling operation, a plurality of locking lug receiving means on said post in spaced relation longitudinally thereof, means carried by said piston adjacent its end remote from said piston head and cooperating with a selected one of said locking lug receiving means for disposing said piston at a given height above said supporting surface, and a locking lug receivable in said cooperating means and in said locking lug receiving means for maintaining said piston at the given height.

4. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first-mentioned piston to firmly seat said dust collecting means against said surface to be drilled and for supplying fluid pressure to said dust collecting means to remove dust therefrom caused by a drilling operation, said floating piston comprising identical body parts disposed in opposed abutting relation, means for securing said parts in their opposed abutting relation, said last mentioned means also defining one element of said spacing means, and a band encircling said parts; means for securing said first fluid seal on said cylinder head with this means defining the other element of said spacing means.

5. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a plurality of superimposed floating pistons disposed in said chamber, a fluid seal carried by each of said floating pistons on one end thereof, spacer means carried by each of said floating pistons whereby the seal on the uppermost one of said floating pistons is maintained in spaced relation to said first fluid seal to define a first expansible fluid receiving compartment, and whereby the seals on subsequent floating pistons are maintained in spaced relation with the other end of the piston thereabove remote from the end carrying the seal to define additional expansible fluid receiving compartments, dust collecting means mounted on said closed end of said cylinder for movement in an arcuate path for engagement with a surface to be drilled, means for supplying fluid under pressure to each of said compartments, valve means interposed between said fluid supplying means and each of said compartments whereby the fluid can be introduced into a selected one of said compartments for causing expansion thereof by impinging on said cylinder head to move said cylinder longitudinally of said first-mentioned piston to firmly seat said dust collecting means against said surface to be drilled, and fluid supplying means operatively connected to said dust collecting means for removing dust therefrom caused by a drilling operation.

6. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a plurality of superimposed floating pistons disposed in said chamber, a fluid seal carried by each of said floating pistons on one end thereof spacer means carried by each of said floating pistons whereby the seal on the uppermost one of said floating pistons is maintained in spaced relation to said first fluid seal to define a first expansible fluid receiving compartment, and whereby the seals on subsequent floating pistons are maintained in spaced relation with the other end of the piston thereabove remote from the end carrying the seal to define additional expansible fluid receiving compartments, dust collecting means mounted on said closed end of said cylinder for movement in an arcuate path for engagement with a surface to be drilled, means for supplying fluid under pressure to each of said compartments, valve means interposed between said fluid supplying means and each of said compartments whereby the fluid can be introduced into a selected one of said compartments for causing expansion thereof by impinging on said cylinder head to move said cylinder longitudinally of said first-mentioned piston to firmly seat said dust collecting means against said surface to be drilled, and fluid supplying means operatively connected to said dust collecting means for removing dust therefrom caused by a drilling operation, said dust collecting means comprising a dust collecting head including a saddle mounted on the closed end of said cylinder for movement in an arcuate path about an axis perpendicular to the axis of said cylinder, a dust collecting cup mounted on said saddle for movement in an arcuate path about an axis parallel to and spaced from the axis about which said saddle moves in its arcuate path, the movement of said saddle and said cup permitting sealing contact of said cup with the surface to be drilled regardless of the angular disposition of said surface, and an exhaust conduit carried by said cup and operatively connected to said means supplying fluid under pressure.

7. A dust collector for drills, comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a plurality of superimposed floating pistons disposed in said chamber, a fluid seal carried by each of said floating pistons on one end thereof, spacer means carried by each of said floating pistons whereby the seal on the uppermost one of said floating pistons is maintained in spaced relation to said first fluid seal to define a first expansible fluid receiving compartment, and whereby the seals on subsequent floating pistons are maintained in spaced relation with the other end of the piston thereabove remote from the end carrying the seal to define additional expansible fluid receiving compartments, dust collecting means mounted on said closed end of said cylinder for movement in an arcuate path for engagement with a surface to be drilled, means for supplying fluid under pressure to each of said compartments, valve means interposed between said fluid supplying means and each of said compartments whereby the fluid can be introduced into a selected one of said compartments for causing expansion thereof by impinging on said cylinder head to move said cylinder longitudinally of said first-mentioned piston to firmly seat said dust collecting means against said surface to be drilled, and fluid supplying means operatively connected to said dust collecting means for removing dust therefrom caused by a drilling operation, a plurality of locking lug receiving means on said post in spaced relation longitudinally thereof, means carried by said piston adjacent its end remote from said piston head and cooperating with a selected one of said locking lug receiving means for disposing said piston at a given height above said supporting surface, and a locking lug receivable in said cooperating means and in said locking lug receiving means for maintaining said piston at the given height.

8. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a plurality of superimposed floating pistons disposed in said chamber, a fluid seal carried by each of said floating pistons on one end thereof, spacer means carried by each of said floating pistons whereby the seal on the uppermost one of said floating pistons is maintained in spaced relation to said first fluid seal to define a first expansible fluid receiving compartment, and whereby the seals on subsequent floating pistons are maintained in spaced relation with the other end of the piston thereabove remote from the end carrying the seal to define additional expansible fluid receiving compartments, dust collecting means mounted on said closed end of said cylinder for movement in an arcuate path for engagement with a surface to be drilled, means for supplying fluid under pressure to each of said compartments, valve means interposed between said fluid supplying means and each of said compartments whereby the fluid can be introduced into a selected one of said compartments for causing expansion thereof by impinging on said cylinder head to move said cylinder longitudinally of said first-mentioned piston to firmly seat said dust collecting means against said surface to be drilled, and fluid supplying means operatively connected to said dust collecting means for removing dust therefrom caused by a drilling operation, each of said floating pistons comprising identical body parts disposed in opposed abutting relation, means for securing said parts in their opposed abutting relation, and a band encircling said parts.

9. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first-mentioned piston to firmly seat said dust collecting means against said surface to be drilled and for supplying fluid pressure to said dust collecting means to remove dust therefrom caused by a drilling operation, said dust collecting means comprising a dust collecting head including a saddle mounted on the closed end of said cylinder for movement in an arcuate path about an axis perpendicular to the axis of said cylinder, a dust collecting cup mounted on said saddle for movement in an arcuate path about an axis parallel to and spaced from the axis about which said saddle moves in its arcuate path, the movement of said saddle and said cup permitting sealing contact of said cup with the surface to be drilled regardless of the angular disposition of said surface, and an exhaust conduit carried by said cup and operatively connected to said means supplying fluid under pressure, a plurality of locking lug receiving means on said post in spaced relation longitudinally thereof, means carried by said piston adjacent its end remote from said piston head and cooperating with a selected one of said locking lug receiving means for disposing said piston at a given height above said supporting surface, and a locking lug receivable in said cooperating means and in said locking lug receiving means for maintaining said piston at the given height.

10. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first-mentioned piston to firmly seat said dust collecting means against said surface to be drilled and for supplying fluid pressure to said dust collecting means to remove dust therefrom caused by a drilling operation, a plurality of locking lug receiving means on said post in spaced relation longitudinally thereof, means carried by said piston adjacent its end remote from said piston head and cooperating with a selected one of said locking lug receiving means for disposing said piston at a given height above said supporting surface, and a locking lug receivable in said cooperating means and in said locking lug receiving means for maintaining said piston at the given height, said floating piston comprising identical body parts disposed in opposed abutting relation, means for securing said parts in their opposed abutting relation, said last mentioned means also defining one element of said spacing means, and a band encircling said parts; means for securing said first fluid seal on said cylinder head with this means defining the other element of said spacing means.

11. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a plurality of superimposed floating pistons disposed in said chamber, a fluid seal carried by each of said floating pistons on one end thereof, spacer means carried by each of said floating pistons whereby the seal on the uppermost one of said floating pistons is maintained in spaced relation to said first fluid seal to define a first expansible fluid receiving compartment, and whereby the seals on subsequent floating pistons are maintained in spaced relation with the other end of the piston thereabove remote from the end carrying the seal to define additional expansible fluid receiving compartments, dust collecting means mounted on said closed end of said cylinder for movement in an arcuate path for engagement with a surface to be drilled, means for supplying fluid under pressure to each of said compartments, valve means interposed between said fluid supplying means and each of said compartments whereby the fluid can be introduced into a selected one of said compartments for causing expansion thereof by impinging on said cylinder head to move said cylinder longitudinally of said first-mentioned piston to firmly seat said dust collecting means against said surface to be drilled, and fluid supplying means operatively connected to said dust collecting means for removing dust therefrom caused by a drilling operation, said dust collecting means comprising a dust collecting head including a saddle mounted on the closed end of said cylinder for movement in an arcuate path about an axis perpendicular to the axis of said cylinder, a dust collecting cup mounted on said saddle for movement in an arcuate path about an axis parallel to and spaced from the axis about which said saddle moves in its arcuate path, the movement of said saddle and said cup permitting sealing contact of said cup with the surface to be drilled regardless of the angular disposition of said surface, and an exhaust conduit carried by said cup and operatively connected to said means supplying fluid under pressure, a plurality of locking lug receiving means on said post in spaced relation longitudinally thereof, means carried by said piston adjacent its end remote from said piston head and cooperating with a selected one of said locking lug receiving means for disposing said piston at a given height above said supporting surface, and a locking lug receivable in said cooperating means and in said locking lug receiving means for maintaining said piston at the given height.

12. A dust collector for drills comprising a post extending upwardly from a supporting surface, a piston carried by said post and extending longitudinally upwardly therefrom, a cylinder having a closed end defining the cylinder head mounted on said piston and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, means for supplying fluid under pressure to said expansible compartment for causing expansion thereof by impingement of the fluid under pressure upon said cylinder head to move said cylinder longitudinally of said first mentioned piston to firmly seat said dust collecting means against said surface to be drilled and for supplying fluid pressure to said dust collecting means to remove dust therefrom caused by a drilling operation, and fluid exhaust means in operative communication with said expansible compartment and selectively operable to exhaust fluid from said compartment to move said dust collecting means from its seat against the surface to be drilled to an inoperative position.

13. A dust collector for drills comprising a post extending upwardly from a supporting surface, a piston carried by said post and extending longitudinally upwardly therefrom, a cylinder having a closed end defining the cylinder head mounted on said pistion and telescopically enclosing the piston with the head of the piston spaced from said cylinder head, said cylinder slidably mounted on said piston for movement longitudinally thereof, a first fluid seal carried by the cylinder head and a second fluid seal carried by said piston head to define a fluid receiving chamber therebetween, a floating piston carrying a fluid seal thereon at one end thereof and disposed in said chamber, spacing means for maintaining the seal on said floating cylinder in spaced relation with said first fluid seal to define an expansible fluid receiving compartment, dust collecting means mounted on said closed cylinder end for movement in an arcuate path for engagement with a surface to be drilled, and means for supplying fluid under pressure to said expansible compartment for causing expansion thereof by impingement of the fluid under pressure upon said cylinder head to move said cylinder longitudinally of said first mentioned piston to firmly seat said dust collecting means against said surface to be drilled and for supplying fluid pressure to said dust collecting means to remove dust therefrom caused by a drilling operation, said dust collecting means comprising a dust collecting head including a saddle mounted on the closed end of said cylinder for movement in an arcuate path about an axis perpendicular to the axis of said cylinder, a dust collecting cup mounted on said saddle for movement in an arcuate path about an axis parallel to and spaced from the axis about which said saddle moves in its arcuate path, the movement of said saddle and said cup permitting sealing contact of said cup with the surface to be drilled regardless of the angular disposition of said surface, and an exhaust conduit carried by said cup and operatively connected to said means supplying fluid under pressure, and fluid exhaust means in operative communication with said expansible compartment and selectively operable to exhaust fluid from said compartment to move said dust collecting means from its seat against the surface to be drilled to an inoperative position.

References Cited in the file of this patent

UNITED STATES PATENTS

| | | |
|---|---|---|
| 1,930,099 | Kelley | Oct. 10, 1933 |
| 2,596,670 | Francis et al. | May 13, 1952 |
| 2,634,952 | Brinkley | Apr. 14, 1953 |
| 2,683,587 | Gunning | July 13, 1954 |